United States Patent
Robin et al.

(10) Patent No.: US 12,490,321 B2
(45) Date of Patent: Dec. 2, 2025

(54) CONTROL DEVICE AND ASSOCIATED CONFIGURATION METHOD

(71) Applicant: SOMFY ACTIVITES SA, Cluses (FR)

(72) Inventors: Serge Robin, Cluses (FR); Arnaud Desbiolles, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 511 days.

(21) Appl. No.: 17/790,446

(22) PCT Filed: Dec. 30, 2020

(86) PCT No.: PCT/FR2020/052639
§ 371 (c)(1),
(2) Date: Jun. 30, 2022

(87) PCT Pub. No.: WO2021/136917
PCT Pub. Date: Jul. 8, 2021

(65) Prior Publication Data
US 2023/0039300 A1   Feb. 9, 2023

(30) Foreign Application Priority Data
Dec. 31, 2019  (FR) ...................................... 1915794

(51) Int. Cl.
*H04W 24/02* (2009.01)
*H04L 12/28* (2006.01)
*H04W 76/14* (2018.01)

(52) U.S. Cl.
CPC ......... *H04W 76/14* (2018.02); *H04L 12/2803* (2013.01); *H04W 24/02* (2013.01)

(58) Field of Classification Search
CPC .. H04W 76/14; H04W 24/02; H04L 12/2803; H02J 3/144; Y02B 70/3225; Y04S 20/222
See application file for complete search history.

(56) References Cited

U.S. PATENT DOCUMENTS

| 2010/0253156 A1 | 10/2010 | Iott et al. |
| 2020/0118401 A1* | 4/2020 | Zalewski ............. G07G 1/0072 |
| 2020/0233388 A1* | 7/2020 | Pognant ................ H04L 67/125 |

FOREIGN PATENT DOCUMENTS

| EP | 3300308 A1 | 3/2018 |
| FR | 3058808 A1 | 5/2018 |
| WO | 2019004824 A1 | 1/2019 |

OTHER PUBLICATIONS

International Search Report for International Application No. PCT/FR2020/052639; Date of Completion: Apr. 21, 2021; Date of Mailing: May 3, 2021; 4 Pages.

(Continued)

*Primary Examiner* — Chuong A Ngo
(74) *Attorney, Agent, or Firm* — CANTOR COLBURN LLP (57) ABSTRACT

Disclosed is a control device for transmitting a control signal to a receiver device in a home-automation installation, comprising a wireless transmitter/receiver configured to receive an incident signal originating from a transmission device, an actuating unit configured to receive a configuration instruction, a processing logic unit suitable for deciding on the transmission of the control signal by the wireless transmitter/receiver, and configured to receive a configuration instruction originating from the actuating unit; and generating at least one configuration message to be transmitted to the receiver device; the wireless transmitter/receiver also being configured to transmit the at least one configuration message to the receiver device.

16 Claims, 3 Drawing Sheets

(56) References Cited

OTHER PUBLICATIONS

Translation of International Search Report for International Application No. PCT/FR2020/052639; Date of Completion: Apr. 21, 2021; Date of Mailing: May 3, 2021; 2 Pages.
Written Opinion for International Application No. PCT/FR2020/052639; Date of Mailing: May 3, 2021; 9 Pages.
Translation of Written Opinion for International Application No. PCT/FR2020/052639; Date of Mailing: May 3, 2021; 6 Pages.

* cited by examiner

CONTROL DEVICE AND ASSOCIATED CONFIGURATION METHOD

CROSS REFERENCE TO RELATED APPLICATIONS

This application is a National Stage of PCT Application No. PCT/FR2020/052639 filed on Dec. 30, 2020, which claims priority to French Patent Application No. 19/15794 filed on Dec. 31, 2019, the contents each of which are incorporated herein by reference thereto.

TECHNICAL FIELD

The present invention relates to the field of home automation installations. More particularly, the present invention relates to a control device as well as to pairing of said control device in a home automation installation.

BACKGROUND

In a known manner, the document FR1658952A describes a method for pairing a home automation apparatus in a home automation installation. The pairing method described comprises in particular a step of initiating the pairing procedure in which the home automation apparatus emits radiofrequency waves at maximum intensity. An exchange is then initiated between the home automation apparatus and the control center.

However, this solution has limitations.

Indeed, some home automation apparatuses comprise a limited energy source due to their low energy-intensive nominal uses. Pairing these apparatuses as described in the document FR1658952A could drain the energy source of the apparatuses, thereby preventing them from operating normally.

The present invention aims to solve all or part of the drawbacks mentioned above.

BRIEF SUMMARY

To this end, the present invention relates to a control device intended to emit a control signal to a receiver device in a home automation installation, comprising:
- a wireless emitter/receiver configured to receive an incident signal from an emitter device;
- an actuating unit configured to receive a configuration instruction
- a processing logic unit adapted to decide on the emission of the control signal by the wireless emitter/receiver, and configured to:
  - receive a configuration instruction originating from the actuating unit; and
  - generate at least one configuration message to be emitted to the receiver device; the wireless emitter/receiver also being configured to emit the at least one configuration message to the receiver device;
- a converter configured to convert the incident signal into electric current and to power the processing logic unit using said electric current.

Such an arrangement allows the device to use the energy of the incident signal in order to send the configuration signal. Such an arrangement allows the device to send configuration signals without resorting to an internal energy source such as a battery or a cell for example.

According to one embodiment, this arrangement is suitable for a control device provided with an energy generation system for sending control signals. The energy generation system allowing supplying an amount of energy comprised in a first energy amount range. The converter is arranged to generate an amount of energy comprised in a second energy amount range greater than the first energy amount range, from the incident signal. By way of example, this embodiment corresponds to a wireless and batteryless control button provided with an energy generation system.

In particular, the first energy amount range is sufficient for sending at least one control frame, particularly for sending a control frame to a receiver home automation device. However, sending configuration signals requires an amount of energy in a second energy amount range, the values of this second range being greater than the values of the first range. The converter allows supplying energy in the second energy amount range.

According to one embodiment, the converter is configured to convert a radiofrequency signal into electric current.

According to one embodiment, the wireless emitter/receiver is a radiofrequency antenna. Such an arrangement allowing emitting and receiving signals wirelessly and without a direct line of sight.

According to one embodiment, the control device is adapted to send a control signal. A control signal is of any kind such as a synchronization signal, a configuration signal, or a pairing signal for example.

According to one embodiment, the incident signal is a signal that does not carry useful data.

According to one embodiment, the electric current is a direct electric current. Such an arrangement allows the current to be used directly by the logic processing unit and the emitter/receiver without the need for conversion. Such an arrangement allows limiting the overall size of the control device.

According to one embodiment, the emitter device and the receiver device are two devices different from each other. Such a configuration allows using the energy of the emitter device in order to send a message to the receiver device.

According to one embodiment, the receiver device may be of any kind such as the central unit of a home automation installation for example.

According to one embodiment, the device comprises an energy smoothing unit configured to smooth the current derived from the conversion of the incident signal. The smoothing consists of storing a very small amount of energy, in the range of a few hundred of µs to 1 ms, for an intensity of up to 20 mA and an energy of 1 µJoules, in order to avoid rapid variations in the ringing voltage of the processing logical unit.

Such an arrangement allows both simple configuration, low maintenance and environmental impact by the absence of a large storage capacity such as a cell for example, occasional use of the control device without requiring large storage capacity such as a cell or a battery.

According to one embodiment, the energy smoothing unit is a capacitor.

According to one embodiment, the energy derived from the incident signal is stored in the capacitor. Such an arrangement allows a control device comprising an external energy source such as a solar power supply to be put into operation even when said external power supply no longer powers the control device.

Such an arrangement allows the device to emit control signals without requiring a cell or a battery. Such an arrangement allows the device to be more compact while reducing its ecological footprint. In addition, the cells have a limited lifetime, so such an arrangement allows greatly improving the lifetime of the control device.

According to one embodiment, the configuration message is a pairing message.

Such an arrangement allows using the energy of the incident signal to carry out the pairing of the device in the home automation installation. Indeed, in nominal use, the control device consumes only a small amount of energy whereas during its pairing, it needs to multiply the exchanges with one or more other apparatuses, which requires a much greater large amount of energy.

According to one embodiment, the emitter device from which the incident signal is emitted is a smartphone.

Such an arrangement allows using the energy of the smartphone when configuring the control device. Indeed, the energy stored in the capacitor is sufficient to ensure the nominal operation of the device. This therefore allows reducing both the size of the device and its ecological footprint.

According to one embodiment, the incident signal may be of any type such as using the 3G, 4G, GSM, GPSR, WIFI or Bluetooth protocol. Such an arrangement allows sending a control or configuration message using devices very commonly present on the market.

According to one embodiment, the incident signal originating from an emitter device and the configuration signal sent to the receiver device have different frequencies.

The terms "different frequencies" mean two frequencies between which there is a difference of more than 0.1% or a few MHz. By way of example, the incident signal may be a signal at a frequency in the range of 2.4 Ghz and the configuration signal may be sent at a frequency in the range of 868 MHz corresponding to that of a home automation protocol.

Such an arrangement allows the emitter/receiver to send the configuration signal while receiving the incident signal. Such an arrangement therefore allows using the electric current derived from the conversion of the incident signal to send the configuration signal.

According to one embodiment, the incident signal originating from an emitter device and the configuration signal sent to the receiver device have the same frequencies. The terms "same frequencies" mean the fact that the frequency of the incident signal and the frequency of the configuration signal have a difference of less than 0.1% or a few MHz. In particular, in this case, the control device may be configured to switch from a first operation mode of receiving the incident signal originating from the emitter device intended for energy storage, to a second operation mode of emission in which the configuration signal is emitted to the receiver device.

In particular, the passage from the first operation mode to the second operation mode is carried out when the device has sufficient energy available in the energy smoothing unit to undertake the emission of at least one configuration message, and in particular to undertake an exchange of messages corresponding to a complete configuration of a receiver device. In this case, the smoothing unit corresponds to an energy storage unit.

According to one embodiment, the control device is configured to receive and convert the incident signal when the processing logic unit is powered off.

According to one embodiment, the converter is configured to generate a binary signal intended for the processing logic unit.

According to one embodiment, the value of the generated binary signal depends on the reception state of the incident signal.

According to one embodiment, the emitter/receiver is electrically connected to a first diode, said first diode being configured to be turned on in the signal receiving direction. The emitter/receiver is also electrically connected to a second diode, said second diode being configured to be turned on in the signal emission direction. The first diode is electrically connected to the converter while the second diode is electrically connected to the processing logic unit. Such an arrangement allows the incident signal to be automatically directed to the converter, even when the processing logic unit is powered off. Such an arrangement allows obtaining an electric current to power the processing logic unit and to send a control and/or configuration signal even without an internal power supply to the control device.

The invention also relates to a method for configuring a control device intended to emit a control signal to a home automation installation, wherein the control method executed by the control device (CMD) comprises:
  a step of receiving an incident signal originating from an emitter device;
  a step of converting the incident signal into electric current; and
  a step of receiving a configuration instruction;
  a configuration step in which the control device emits at least one configuration message to a receiver device in the home automation installation using the electric current derived from the conversion of the incident signal.

Such an arrangement allows the device to send configuration messages upon receipt of the incident signal combined with actuation of the actuating unit. Such an arrangement allows setting the control device in a configuration mode only at the request of the user. Such an arrangement prevents cases in which the control device receives an incident signal which is not intended for it.

According to one embodiment, the electric current is a direct electric current. Such an arrangement allows the current to be used directly by the logic processing unit and the emitter/receiver without the need for conversion. Such an arrangement allows limiting the overall size of the control device.

Such an arrangement allows using the energy of the incident signal to carry out the configuration of the device in the home automation installation. Indeed, in nominal use, the control device consumes only a small amount of energy whereas during its configuration, it needs to multiply the exchanges with the central unit of the home automation installation, which requires a much greater amount of energy. This greater amount of energy used is that of the incident signal.

According to one embodiment, the emitter device and the receiver device are two devices different from each other. Such a configuration allows using the energy of the emitter device in order to send a message to the receiver device.

According to one embodiment, the receiver device may be of any kind such as the central unit of a home automation installation for example.

According to one embodiment, the configuration instruction received at the step of receiving a configuration instruction comprises one or several of the following information:
  a synchronization pattern allowing synchronizing the control device with the emitter device;

a header comprising a protocol version identifier allowing the emitter device to designate to the control device the emission protocol used;

data such as a network address corresponding to the receiver device for example; and/or a checksum allowing checking the proper transfer of the data.

According to one embodiment, the configuration instruction originates from the emitter device.

BRIEF DESCRIPTION OF THE DRAWINGS

The invention will be even better understood with the aid of the detailed description which is set out below with regards to the appended drawings in which.

DETAILED DESCRIPTION

Figure 1:
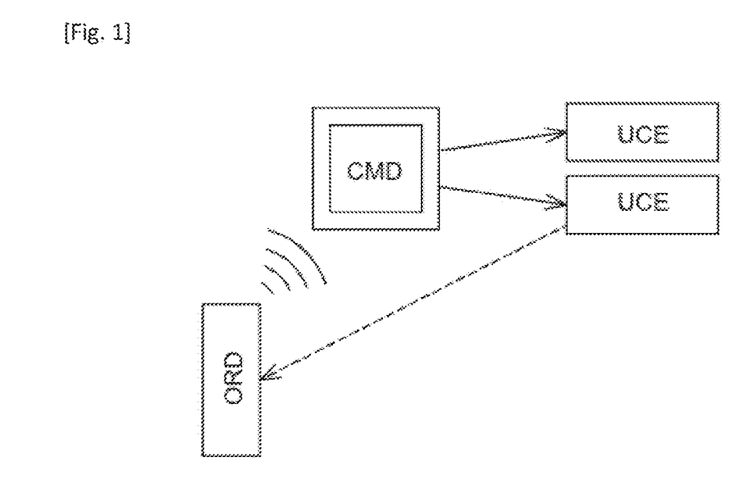
FIG. 1 represents a control device according to the invention within a home automation installation.

FIG. 1 represents a control device CMD intended to emit a control signal to a receiver device UCE in a home automation installation. By way of example, the control device CMD may be a home automation control point, for example a control button, and in particular a batteryless and wireless control button or control point.

Figure 2:
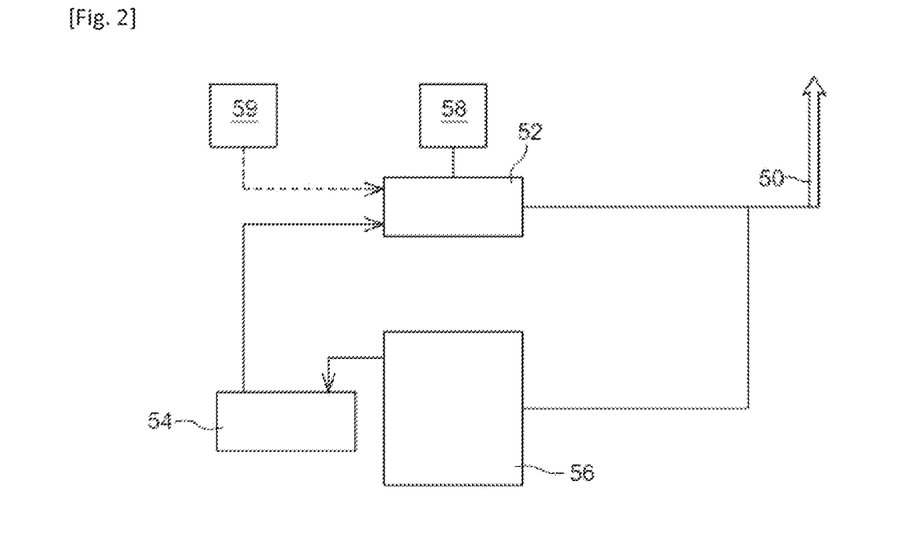
FIG. 2 represents an electrical diagram of a control device according to a first embodiment in accordance with the present invention.

As represented in FIG. 2, according to a first embodiment, the control device CMD comprises a wireless emitter/receiver 50. The wireless emitter/receiver may be an emitter/receiver used by the control device to send control signals. The emitter/receiver is configured to receive an incident signal originating from an emitter device ORD as represented in FIG. 1. The emitter device ORD is preferably a smartphone. Within the meaning of the present invention, the receiver device UCE is a central unit of the home automation installation.

The control device CMD also comprises an actuating unit 58 configured to receive a configuration instruction originating from a user USR. By way of example, the actuating unit may comprise a touch screen, or else a keyboard comprising several keys, the actuation corresponding for example to a combination of keys. The actuating unit may also include a pairing button.

The control device also comprises a processing logic unit 52 adapted to decide on the emission of the control signal by the wireless emitter/receiver 50 comprising a single antenna, and configured to receive a configuration instruction originating from the actuating unit and generate at least one configuration message to be emitted to the receiver device ECU, the wireless emitter/receiver 50 also being configured to emit the at least one configuration message to the receiver device ECU. The wireless emitter/receiver 50 is a radiofrequency antenna. Such an arrangement allows emitting and receiving signals wirelessly and without a direct line of sight.

The control device CMD also comprises a converter 56 configured to convert the incident signal into electric current and to power the processing logic unit 52 using said electric current. Indeed, the converter 56 is configured to convert a radiofrequency signal into direct electric current. Such an arrangement allows the control device CMD to use the energy of the incident signal in order to send the configuration signal. Such an arrangement allows the control device CMD to send configuration signals without resorting to an internal energy source such as a battery or a cell for example.

According to one embodiment, the converter 56 is also configured to generate a binary signal intended for the processing logic unit 52. The generated binary signal depends on the reception state of the incident signal.

According to one embodiment, when an incident signal is received by the wireless emitter/receiver 50 and the converter 56 converts said incident signal into electric current, the converter 56 generates a binary signal intended for the treatment logic unit 52 equal to one. Conversely, when converter 56 does not convert any incident signal, said converter generates a binary signal equal to zero.

According to one embodiment, the generated binary signal intended for the processing logic unit 52 is read by said processing logic unit according to a determined interval such as every 20 ms for example. Such an arrangement allows sending a configuration message comprising one or more information(s) through one or more incident message(s).

Thus, a frame is formed from a succession of binary signals which may contain a wake-up signal (WAKE-UP), a synchronization pattern, a header (HEADER), data (DATA) and a verification code (CRC-4).

Preferably, the wake-up signal comprises four signals equal to 1, so as to provide sufficient energy to process the signals to come.

The converter 56 is suitable for converting an incident signal which may be of any type such as using the 3G, 4G, GSM, GPSR, WIFI or Bluetooth protocol. Such an arrangement allows sending a control or configuration signal using devices very commonly present on the market.

According to one embodiment, the electric current is a direct electric current. Such an arrangement allows the current to be used by the logic processing unit 52 and the emitter/receiver 50 without requiring further conversion. Such an arrangement allows limiting the overall size of the control device CMD.

The control device CDM also comprises an energy smoothing unit 54, configured to smooth the current derived from the conversion of the incident signal. The energy smoothing unit may be of any kind such as a capacitance or a capacitor.

The control device CDM may also comprise or be associated with an electrical energy generation system 59, in particular in the above-mentioned example of a batteryless and wireless control point.

The electrical energy generation system 59 is configured to power components of the device, and in particular the logic processing unit so as to allow the sending of a control signal. For example, it may be an electrodynamic generator or a piezoelectric generator. The energy generation system in nominal use is capable of supplying only a limited but sufficient amount of energy to send a command frame to a receiver home automation device. The generator may be powered, for example, by the mechanical energy corresponding to the pressure of a control button. The amount of energy generated for sending the control signal is included in a first range of values which is lower than a second range of values corresponding to a configuration method, supplied by the converter 56.

Within the meaning of the present invention, an incident signal is a message that does not carry payload data. That is to say that the signal has the sole purpose of being converted and therefore does not emit any payload data to the control device CMD. Thus, any message sent in any protocol may be used because only its conversion into energy counts.

The control device CMD is adapted to send a control signal. A control signal is of any kind, such as a door opening or sun protection deployment signal, for example.

According to one embodiment, the emitter device ORD and the receiver device UCE are two devices different from each other. Such a configuration allows using the energy of the emitter device ORD in order to send a message to the receiver device UCE. According to one embodiment, the receiver device UCE may be of any kind, such as the central unit of a home automation installation for example.

According to the first embodiment shown in FIG. 2, the incident signal from an emitter device ORD and the configuration signal sent to a receiver device UCE have different frequencies. Such an arrangement allows the wireless emitter/receiver 50 to send the configuration signal while receiving the incident signal. Such an arrangement therefore allows to directly use the electric current derived from the conversion of the incident signal to send the configuration signal, while simultaneously using the same antenna.

In this embodiment, the control device CMD is configured to receive and convert the incident signal when the processing logic unit 52 is powered off. Such an arrangement allows the incident signal to be automatically directed to the converter, even when the processing logic unit is powered off. Such an arrangement allows obtaining an electric current to power the processing logic unit and to send a control and/or configuration signal even without an internal power supply to the control device.

Such an arrangement allows the control device CMD to use the energy of the incident signal in order to send a configuration or control signal. Such an arrangement allows the control device CMD to send configuration or control signals without resorting to an internal energy source such as a battery or a cell for example. Such an arrangement allows obtaining a control device CMD having a simple and space-efficient architecture.

The use of the first embodiment corresponds to a scenario in which the incident signal from an emitter device ORD and the configuration signal sent to a receiver device UCE have different frequencies. However, the closer the frequencies of the incident signal from an emitter device ORD and the configuration signal sent to the receiver device UCE will be, and therefore the greater the gain of the antenna will be and the greater the electrical energy derived from the conversion of the incident signal will be.

Figure 3:
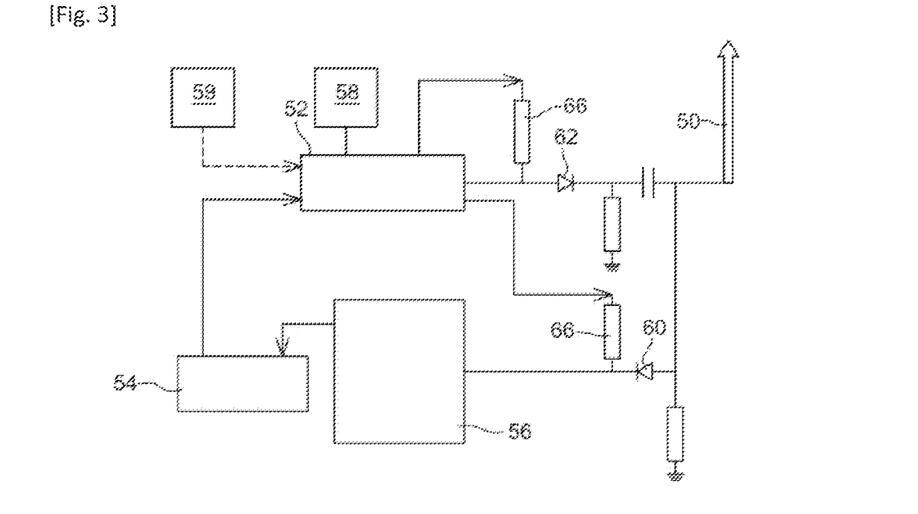
FIG. 3 represents an electrical diagram of a control device according to a second embodiment in accordance with the present invention.

According to a second embodiment shown in FIG. 3, the emitter/receiver is single band, and/or the incident signal and the configuration message are on the same frequency. In this case, it is not possible to emit and receive at the same time on the same frequency using a single wireless emitter/receiver 50. According to this second embodiment, the control device CDM also comprises a wireless emitter/receiver 50, a converter 56, a processing logic unit 52, a actuating unit 58, an energy smoothing unit 54.

The wireless emitter/receiver 50 is electrically connected to a first diode 60, said first diode 60 being configured to be turned on in the reception direction of the incident signal. The wireless emitter/receiver 50 is also electrically connected to a second diode 62, said second diode being configured to be turned on in the signal emission direction. The first diode 60 is electrically connected to the converter 56 while the second diode 60 is electrically connected to the processing logic unit 52.

In other words, the wireless emitter/receiver 50 is passively connected to the converter 56.

These arrangements allow obtaining a control device configured to receive and convert the incident signal when the processing logic unit is powered off in the case of the second embodiment in which the configuration message and the incident signal are on the same frequencies.

Furthermore, the diodes 60 and 62 are controlled by the processing logic unit 52. These arrangements allow the processing logic unit to switch the device from a mode of receiving the incident signal intended for energy storage, to an emission mode in which the configuration signal is emitted to the receiver device when the device has sufficient energy available in the energy smoothing unit 54 which corresponds in this case to an energy storage unit.

The configuration message is a pairing message, such an arrangement allows using the energy of the incident signal to carry out the pairing of the control device CMD in the home automation installation. Indeed, in nominal use, the control device consumes only a small amount of energy whereas during its pairing, it needs to multiply the exchanges with one or more other devices, which requires a much greater large amount of energy. By way of illustration, the energy required to send a frame is in the range of 0.5 mW to 1 mW, whereas the configuration procedure may require around ten of mW to several tens of mW, the emission of several successive frames being necessary.

Figure 4:
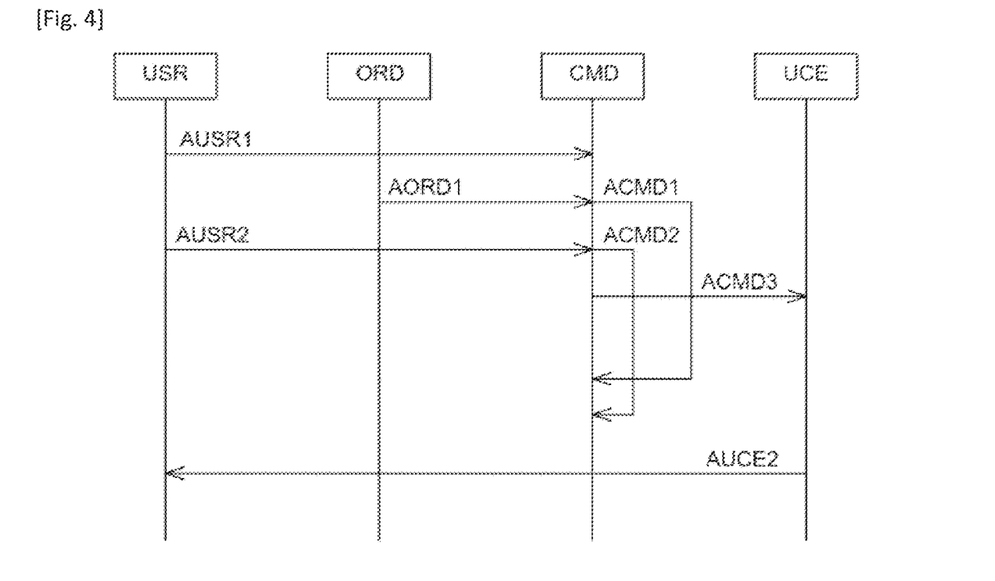
FIG. 4 is a flowchart representing an embodiment of a method for configuring a control apparatus according to a first implementation of the invention.

The invention also relates to a method for configuring a control device CMD intended to emit a control signal to a home automation installation as represented in FIG. 4. The control method is executed by the control device CMD and comprises:

a step of receiving an incident signal AORD1 originating from an emitter device ORD;

a step of converting ACMD1 the incident signal into electric current;

a step of receiving a configuration instruction AUSR2; and an configuration step ACMD2 in which the control device CMD sends ACMD3 at least one configuration message to a receiver device UCE in the home automation installation using the electric current derived from the conversion ACMD1 of the incident signal.

Such an arrangement allows setting the control device in a configuration mode only at the request of the user. Such an arrangement prevents scenario in which the control device receives an incident signal which is not intended for it.

Such an arrangement allows using the energy of the incident signal to carry out the configuration of the control device CMD in the home automation installation. Indeed, in nominal use, the control device CMD consumes only a small amount of energy whereas during its configuration, it needs to multiply the exchanges with the central unit of the home automation installation, which requires a much greater amount of energy. This greater amount of energy used is that of the incident signal converted at the conversion step ACMD1.

According to one embodiment, a user carries out a step of approaching AUSR1 the emitter device ORD to the control device CMD, thus allowing the emitter/receiver 50 to receive a more powerful signal. Thus, the emitter device ORD is at a distance ranging from 2 cm to 3 cm from the control device CMD.

According to one embodiment, the emitter device ORD receives an acknowledgment signal from the receiver device UCE during an acknowledgment step AUCE2. The acknowledgment signal is a confirmation of the proper configuration of the control device CMD. Such an arrangement allows the user to be informed when he could move the emitter device ORD away from the control device CMD.

Figure 5:
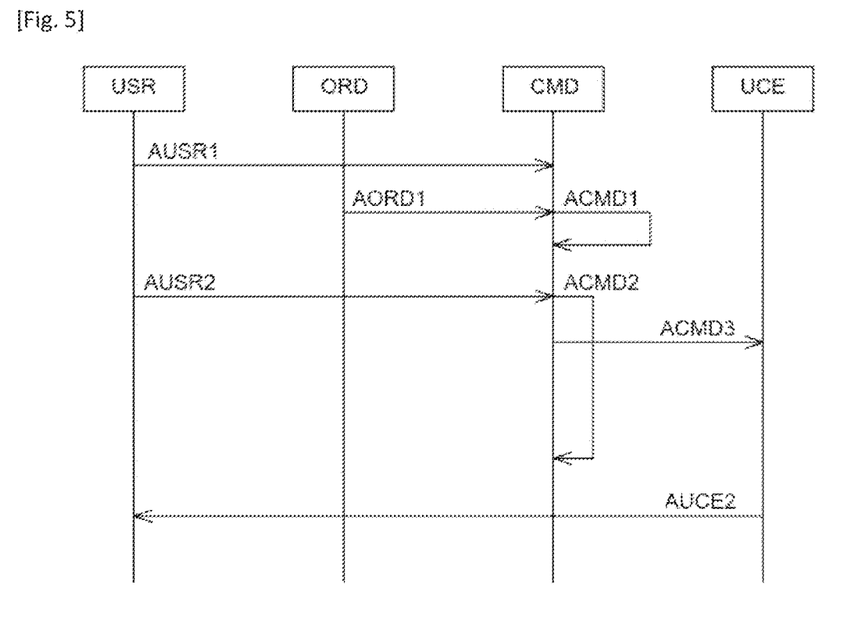
FIG. 5 is a flowchart representing an embodiment of a method for configuring a control apparatus according to a second implementation of the invention.

FIG. 5 represents a second mode of implementation of the invention corresponding in particular to a case in which the incident signal and the configuration message are on the same frequency. The steps described with reference to FIG. 4 concerning the first embodiment are repeated. However, the conversion step ACMD1 comprises a step of storing the energy in the smoothing unit 54. Thus the energy is stored over a period in the range of 20 ms to 100 ms, for an intensity ranging up to 20 mA and an energy ranging from 40 mJoules to several hundred mJoules. Such an arrangement allows storing enough energy to be able to carry out the configuration step ACMD2 as represented in FIG. 5. Such an arrangement therefore allows ensuring a complete configuration of the control device, and this, even in the case where the wireless emitter/receiver 50 no longer receives an incident signal. As indicated previously with reference to FIG. 3, the device switches from a mode of receiving the incident signal intended for energy storage, at the end of step ACMD1, to an emission mode in which the configuration signal is emitted to the receiver device when the device has sufficient energy available in the energy smoothing unit 54 which corresponds in this case to an energy storage unit.

Thus, the arrangements according to the invention allow, by using an external energy source not requiring the addition of specific connection equipment, supplying sufficient energy to a control device, such as for example a batteryless and wireless control point to carry out the pairings with other devices according to common protocols (Zigbee, IO Homecontrol) even if the frames used are often long and are also repeated a large number of times (3 to 20 or even more).

The arrangements according to the invention allows ensuring the proper configuration of the control device since only a few milliwatts, in other words more than one milliwatt, are necessary for the emission of configuration frames whereas a smartphone emits in the range of 500 mW and up to 2000 mW.

By way of example, the invention is particularly suitable for a batteryless and wireless control point whose power generation system in nominal use is only capable of supplying a limited but sufficient amount of energy to send a command frame to a receiver home automation device. This type of energy generator is for example an electrodynamic generator or a piezoelectric generator. The first energy amount range available for this type of generator is between 0.5 mW to 1 mW. Thus, the device of the invention is added to the control point to be able to facilitate the configuration procedure of the control point within the home automation installation. Both will be able to share the same radio circuit as well as the antenna. The actuating unit may be one or more keys activated simultaneously from the control point to give the command to initiate the configuration procedure to the device of the invention.

According to another example, the invention also allows occasional use of the control device without requiring a large storage capacity such as a cell or a battery. Such an arrangement is, for example, suitable for a solar protection control device when said solar protection is only controlled one week per year. Indeed, the control device CMD consumes only a very small amount of energy in nominal operation. An energy smoothing unit could then suffice in certain cases.

The smartphone used to provide energy to the control point in the form of radio waves may advantageously be used with a specific software allowing facilitating the configuration procedure. Thus, it will be possible, using this software, to cause sending of successive frames which will be used by the control point to convert them into energy. It will be possible to have a communication between this receiver device UCE and the smartphone ORD so as to testify to the smooth running of the configuration procedure and to signify the end thereof in order to stop the emission of successive frames that have become useless. The energy autonomy of the smartphone is therefore little impacted.

According to one embodiment, the incident signal comprises a plurality of frames. Such a configuration allows the converter 56 to convert a greater amount of energy and thus to power the processing logic unit 52 sufficiently to carry out the configuration step ACMD3.

According to one embodiment, the step of receiving an incident signal AORD1 is repeated during the method, for example after the step of receiving a configuration instruction AUSR2. Such an arrangement allows obtaining the energy necessary to carry out the various steps of the method without requiring large storage capacities.

According to a particular example, the method comprises:
- a step of receiving an incident signal AORD1, comprising four frames, originating from an emitter device ORD.
- a step of converting ACMD1 the incident signal, comprising four frames, into electric current, such an arrangement allows obtaining the energy necessary for carrying out the various steps of the method;
- a step of receiving a configuration instruction AUSR2;
- a configuration step ACMD2 in which the control device CMD emits ACMD3 at least one configuration message to a receiver device UCE in the home automation installation using the electric current derived from the conversion ACMD1 of the incident signal comprising four frames
- a step of receiving an incident signal comprising a control instruction, originating from the emitter device ORD;
- a step of converting the incident signal comprising a control instruction into electric current;
- a step of demodulating the incident signal comprising a control instruction;
- a control step, in which the control device CMD emits at least one control message to the receiver device UCE using the current derived from the conversion of the incident signal comprising a control instruction.

The control step being carried out on the basis of the demodulated control instruction.

According to one embodiment, the configuration instruction received at the step of receiving a configuration instruction AUSR2 comprises one or more of the following information:
- a synchronization pattern allowing synchronizing the control device CMD with the emitter device ORD;
- a header comprising a protocol version identifier allowing the emitter device to designate to the control device the emission protocol used;
- data such as a network address corresponding to the receiver device UCE, for example; and or
- a checksum allowing checking the proper emission of the data.

According to one embodiment, the incident signal and the configuration instruction are emitted according to the Bluetooth protocol, and more specifically, "Bluetooth Advertising".

According to one embodiment, the configuration instruction originates from the emitter device ORD.

The invention claimed is:

1. A control device intended to emit a control signal intended for a central unit of a home automation installation, comprising:
 a wireless emitter/receiver configured to receive an incident signal from an emitter device;
 an actuating unit configured to receive a configuration instruction;
 a processing logic unit adapted to decide on the emission of the control signal by the wireless emitter/receiver, and configured to:
 receive a configuration instruction originating from the actuating unit; and
 generate at least one configuration message to be emitted to the central unit of the home automation installation, the at least one configuration message comprising a pairing message of the control device in the home automation installation, the wireless emitter/receiver also being configured to emit the at least one configuration message to the central unit of the home automation installation;
 a converter configured to convert the incident signal into electric current and to power the processing logic unit using the electric current, wherein the control device is configured to receive and convert the incident signal when the processing logic unit is powered off.

2. The control device according to claim 1, such that the control device comprises an energy smoothing unit configured to smooth the current derived from the conversion of the incident signal.

3. The control device according to claim 2, such that the energy smoothing unit is a capacitor.

4. The control device according to claim 2, such that the emitter device from which the incident signal is emitted is a smartphone.

5. The control device according to claim 2, such that the incident signal originating from an emitter device and the at least one configuration message sent to the central unit have different frequencies.

6. The control device according to claim 2, such that the incident signal originating from an emitter device and the at least one configuration message sent to the central unit have the same frequencies.

7. The control device according to claim 2, wherein the converter is configured to generate a binary signal intended for the processing logic unit.

8. The control device according to claim 1, such that the emitter device from which the incident signal is emitted is a smartphone.

9. The control device according to any claim 1, such that the incident signal originating from the emitter device and the at least one configuration message sent to the central unit have different frequencies.

10. The control device according to claim 1, such that the incident signal originating from an emitter device and the at least one configuration signal message to the central unit have the same frequencies.

11. The control device according to claim 1, wherein the converter is configured to generate a binary signal intended for the processing logic unit.

12. The control device according to claim 11, wherein a value of the generated binary signal depends on a state of reception of the incident signal.

13. A method for configuring a control device intended to emit a control signal to a central unit of a home automation installation, wherein the method is executed by the control device comprising:
 a step of receiving an incident signal originating from an emitter device;
 a step of converting the incident signal into electric current, the step of receiving and the step of converting being executed when a processing logic unit of the control device is powered off; and
 a step of receiving a configuration instruction;
 a configuration step in which the control device emits at least one configuration message to central unit of the home automation installation using the electric current derived from the conversion of the incident signal, wherein the at least one configuration message comprises a pairing message of the control device in the home automation installation.

14. The method according to claim 13, wherein the configuration instruction received at the step of receiving a configuration instruction comprises one or more of the following information:
 a synchronization pattern allowing synchronizing the control device with the emitter device;
 a header comprising a protocol version identifier allowing the emitter device to designate to the control device the protocol version used;
 data such as a network address corresponding to the central unit for example; and/or
 a checksum allowing checking the proper emission of the data.

15. The method according to claim 14, wherein the configuration instruction originates from the emitter device.

16. The method according to claim 13, wherein the configuration instruction originates from the emitter device.

* * * * *